US006108097A

United States Patent [19]

Suzuki et al.

[11] Patent Number: 6,108,097

[45] Date of Patent: Aug. 22, 2000

[54] MODE CONTROL SYSTEM

[75] Inventors: Minoru Suzuki; Kiyoshi Negishi; Katsumi Kawamura; Mikio Horie; Hiroshi Orita; Katsuyoshi Suzuki, all of Tokyo, Japan

[73] Assignee: Asahi Kogaku Kogyo Kabushiki Kaisha, Tokyo, Japan

[21] Appl. No.: 08/906,430

[22] Filed: Aug. 5, 1997

Related U.S. Application Data

[63] Continuation of application No. 08/452,290, May 26, 1995, abandoned.

[30] Foreign Application Priority Data

May 27, 1994 [JP] Japan .................................... 6-128226

[51] Int. Cl.[7] ...................................................... G06F 15/00

[52] U.S. Cl. ............................................ 358/1.13; 358/1.1

[58] Field of Search .................................... 395/101, 109, 395/112, 114, 117, 527, 200.3, 570, 800; 358/500, 501, 530, 401, 412, 437, 468

[56] References Cited

U.S. PATENT DOCUMENTS

| | | | |
|---|---|---|---|
| 4,480,329 | 10/1984 | Bordebelle | 395/183.07 |
| 4,695,942 | 9/1987 | Levine et al. | 364/188 |
| 4,707,848 | 11/1987 | Durston et al. | 379/1 |
| 4,797,864 | 1/1989 | Stano et al. | 368/111 |
| 5,162,721 | 11/1992 | Sato | 320/15 |
| 5,307,001 | 4/1994 | Heavey | 320/30 |
| 5,348,407 | 9/1994 | Hocu et al. | 400/711 |
| 5,448,153 | 9/1995 | Iueda et al. | 320/30 |
| 5,515,087 | 5/1996 | Lim et al. | 347/14 |
| 5,570,962 | 11/1996 | Suzuki et al. | 400/120.16 |
| 5,599,113 | 2/1997 | Suzuki et al. | 400/120.16 |
| 5,638,104 | 6/1997 | Suzuki et al. | 347/171 |
| 5,669,720 | 9/1997 | Negishi et al. | 400/120.05 |
| 5,677,721 | 10/1997 | Suzuki et al. | 347/190 |

OTHER PUBLICATIONS

Japanese Abstract, Battery refresh system 07–241641, Morita et al., Sep. 12, 1995.

*Primary Examiner*—Dov Popovici
*Assistant Examiner*—Gabriel I. Garcia
*Attorney, Agent, or Firm*—Greenblum & Bernstein, P.L.C.

[57] ABSTRACT

A mode control system is provided for a printer having an internal battery. The mode control system selects at least a charge operation for charging the battery and a printing operation for printing an image on a recording sheet fed into the printer. The mode control system also includes a manually operable member. A duration of an operation of the manually operable member is detected, and one of the charge operation and the print operation is selected in accordance with the duration of the operation of the manually operable member.

4 Claims, 5 Drawing Sheets

MODE CONTROL SYSTEM

This application is a continuation of application Ser. No. 08/452,290, filed May 26, 1995, now abandoned.

BACKGROUND OF THE INVENTION

The present invention relates to a mode control system for selecting a mode of operation of an apparatus. More specifically, the present invention relates to a mode control system for a thermal printer which has more than one mode of operation.

There are presently many apparatuses which have more than one mode of operation. For instance, a thermal printer having a built-in battery has a normal printing mode, a battery refresh mode, and a battery charge mode.

In the conventional thermal printer, many operational buttons or switches are provided in order to select the mode of operation. Further, other operational buttons are provided for turning the power ON and OFF, and for feeding a thermosensitive sheet on which an image is formed. Therefore, many operational buttons are required in order to provide the many modes of operation of the thermal printer. However, in order to reduce the size of the thermal printer, the number of operational buttons should be reduced. If the number of operational buttons in reduced the performance of the thermal printer will be reduced.

SUMMARY OF THE INVENTION

It is therefore an object of the present invention to provide an improved mode control system for a thermal printer, which will reduce the number of operational buttons on the thermal printer while providing a plurality of operating nodes of the thermal printer.

According to an aspect of the present invention, there is provided a mode control system for a printer having an internal battery. The mode control system selects at least a charge operation for charging the battery and a printing operation for printing an image on a recording sheet fed into the printer. The mode control system also includes a manually operable member. A duration of operation of the manually operable member is detected and one of the charge operation and the print operation is selected in accordance with the duration of the operation of the manually operable member.

In the preferred embodiment, the manually operable member includes a switch such as a push button switch, which selects the mode of operation in accordance with a length of time of pressing the push button. This allows a single switch to select a plurality of operating modes, thereby reducing the number of parts needed to manufacture the apparatus. The size of the printer can therefore be reduced. Further, the made control system can directly select different modes of operation, therefore improving operability of the apparatus.

Further, the charge operation includes a refresh mode, where the internal battery is completely discharged, and a charge mode, where the internal battery is charged. If the manually operable member is operated for longer than one second, the refresh mode is selected. Then charge mode is then automatically selected when the refresh mode has finished operating.

Furthermore, if the manually operable member in again operated for longer than one second when the refresh mode is selected, the charge mode is selected. Thus if the battery is already completely discharged, charging of the battery can be started immediately, without waiting for the refresh mode to finish operating.

Optionally, the mode control system enters a stop mode (i.e., standby operation mode), where the power is turned OFF, directly from any of the other modes of operation if the manually operable member is operated twice within a 500 msec. time interval.

Further, the stop mode is entered automatically if the print operation has finished operating and a time interval of 60 seconds has elapsed. This reduces the overall power consumption of the printer.

Furthermore, the stop mode in entered automatically if the charge operation has finished operating.

According to another aspect of the present invention, there is provided a mode control system for a printer having an internal battery. The mode control system selects at least a charge operation for charging the battery and a printing operation for printing an image on a recording sheet fed into the printer. The made control system also includes a manually operable member. A duration and frequency of the operation of the manually operable member is detected and one of the charge operation and the print operation is selected in accordance with at least the duration or a frequency of the operation of the manually operable member.

DESCRIPTION OF THE EMBODIMENTS

Figure 1:
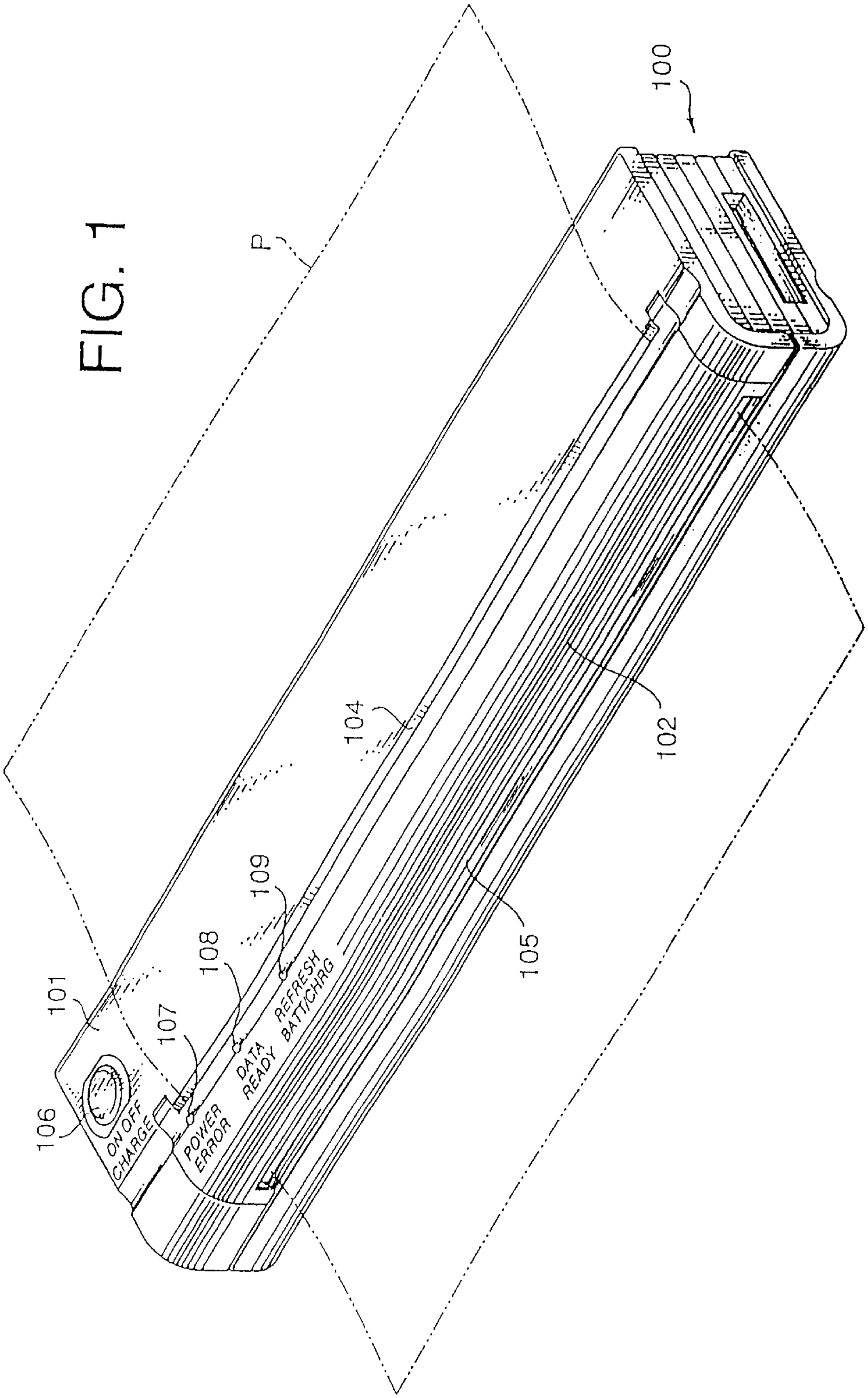
FIG. 1 shows a perspective view of a thermal printer embodying the present invention.

FIG. 1 is a perspective view of a thermal printer 100 embodying the mode control system according to the present invention. The thermal printer 100 has a main housing 101, and a platen roller cover 102. The platen roller cover 102 is hinged, and can swing to expose a platen roller (not shown).

Three indicators 107, 108 and 109 are formed on a top surface of the platen roller cover 102. In this embodiment, the three indicators 107, 106 and 109 are LEDs. The indicator 107 indicates whether the power is ON or OFF. The indicator 108 indicates whether data is being received. The indicator 109 indicates information about the operation of a built-in battery (not shown in FIG. 1), such as whether the built-in battery is being refreshed (i.e., completely discharged) or charged.

Paper used with the thermal printer 100 is fed into a slot 104 formed between the platen roller cover 102 and the housing 101. An image is formed on the paper using a thermal printing head 41 (see FIG. 2). The paper then exits the thermal printer 100 through a slot 105, formed between the platen roller cover 102 and the housing 101.

A mode switch 106 is located on the top surface of the housing 101. The mode switch 106 is a push button switch and is normally open. By pressing the mode switch 106, various modes of operation of the thermal printer 100 are selected. In the present embodiment, the mode switch 106 also turns the power ON and OFF.

Figure 2:
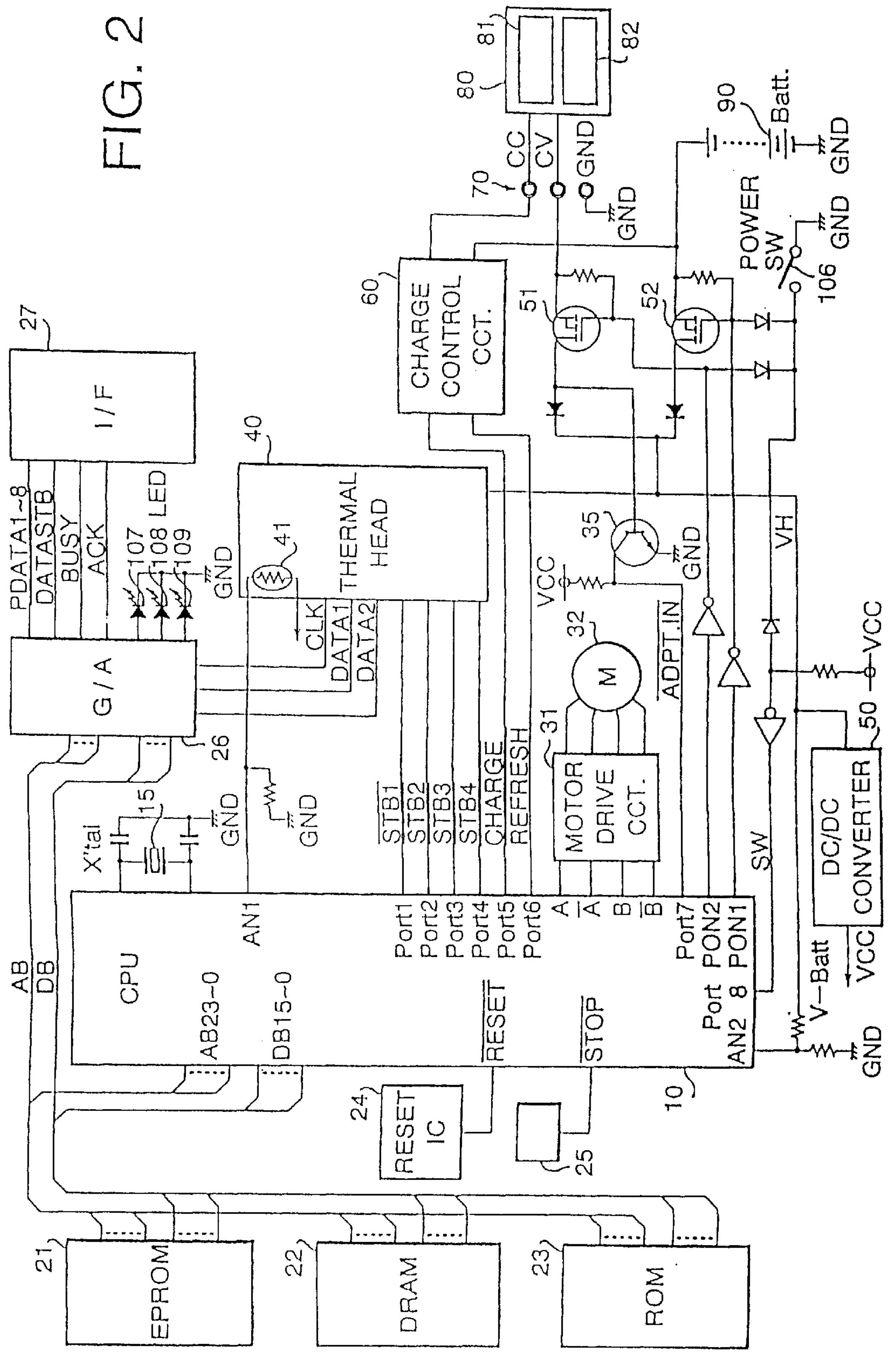
FIG. 2 shows a schematic diagram of the thermal printer shown in FIG. 1.

FIG. 2 in a schematic diagram of the thermal printer 100 shown in FIG. 1.

A CPU 10 controls an operation of the thermal printer 100. In the embodiment, the CPU 10 is a microprocessor which can address up to 16 MB (megabytes). The CPU 10 transmits address information from address ports AB0 through AB23, along an address bus AB. The CPU 10 transmits and receives data through data ports DB0 through DB15 and a data bus DB. The CPU 10 is connected to an EPROM 21, a DRAM 22, a font ROM 23, and a gate array 26, via the address bus AB and data bus DB.

The EPROM 21 stores data and software that control printer performance, as well as an initial operation of the thermal printer 100 when the power is turned ON. The DRAM 22 (dynamic RAM) has an area where a bit-map of the image is developed, an area for storing data transmitted through an interface 27, and some other work areas. The font ROM 23 stores font data used for developing the bit-mapped image that is stored in the DRAM 22.

The CPU 10 uses a gate array 26 to exchange data through the interface 27, and drive the indicators 107, 108 and 109.

The interface 27 is a printer interface (e.g. Centronics interface) which receives print data and control data from a hoot computer (not shown). The printer interface has eight data lines PDATA 1 through PDATA 8, and three control lines $\overline{\text{DATASTB}}$, BUSY, and ACK. The eight data lines PDATA 1 through PDATA 8 transfer the print data from the host computer. The $\overline{\text{DATASTB}}$ control line inputs data to the printer 100 from the host computer. The BUSY control line indicates that the printer 100 cannot accept the print data, while the ACK control line acknowledges reception of the print data. In the specification, a control line, port or signal having a "bar" over its name indicates an active low control line, port or signal, respectively.

A divided voltage V_BATT of the built-in battery (or an external DC voltage) is applied to an analog port AN2 of the CPU 10. The CPU 10 A/D converts the applied analog voltage to a digital value, and detects the voltage of the built-in battery (or external DC source).

A reset IC 24 transmits a reset signal ($\overline{\text{RESET}}$) to a CPU port $\overline{\text{RESET}}$, when the detected voltage level of the battery is lower than a predetermined voltage level. When the $\overline{\text{RESET}}$ signal in LOW, the CPU 10 stops operation of the printer 100. Therefore, the printing operation stops when the voltage of the built-in battery (or external DC voltage) is below the predetermined level.

A sensor 25, mounted on the platen roller cover 102, detects the presence of the thermosensitive paper in a sheet feed path of the printer 100. If the thermosensitive paper is located in the sheet feed path, the sensor 25 transmits a paper-detect signal to a port PTOP of the CPU 10. By monitoring the port PTOP, the CPU 10 determines whether the printer 100 has a thermosensitive paper loaded in the sheet feed path, and therefore whether the printer 100 is ready to start the printing operation.

A reference clock signal CLK is generated by crystal 15. In accordance with the reference clock signal CLK, the bit map of the print data is developed in the DRAM 22. The data written in the DRAM 22 is transmitted to the gate array 26 and synchronized with the reference clock signal CLK, before being transferred to the thermal print head 40. The data transferred to the thermal head 40 is separated into two separate data blocks: DATA1 and DATA2.

The thermal print head 40 has a plurality of thermal elements (not shown). The heat energy generated by each of the thermal elements is controlled by strobe signals $\overline{\text{STB1}}$, $\overline{\text{STB2}}$, $\overline{\text{STB3}}$, $\overline{\text{STB4}}$ (described later), which are transmitted from the ports Port 1 through Port 4 of the CPU 10. Thus, DATA1 and DATA2 identify the thermal elements to be driven, and strobe signals $\overline{\text{STB1}}$ through $\overline{\text{STB4}}$ drive the identified thermal elements to generate the required heat energy for printing the image.

A thermistor 41 is provided on the thermal head 40 for detecting the temperature of the thermal head 40. The output of the thermistor 41 is input to a port AN1 of the CPU 10. The CPU 10 A/D converts the signal input to the port AN1, and detects the temperature of the thermal head 40.

A motor driving signal is transmitted from ports, A, $\overline{\text{A}}$, B, $\overline{\text{B}}$, for controlling a motor driving circuit 31. The motor driving circuit 31 drives a motor 32. The motor driving circuit 31 will be described in more detail later.

A port PON1 outputs a signal for turning ON or OFF a FET 52. A port PON2 outputs a signal for turning ON or OFF a FET 51. If an external power source (such as an AC adapter) is used to power the printer 100, a transistor 35 in turned ON thereby changing the signal $\overline{\text{ADPT.IN}}$ from High to Low. The CPU 10 monitors the $\overline{\text{ADPT.IN}}$ signal at Port 7, and determines whether the external power supply is connected. If the external power supply is connected (i.e., $\overline{\text{ADPT.IN}}$ is Low), then the CPU 10 drives the FET 51 through port PON2. If the external power supply is not connected (i.e., $\overline{\text{ADPT.IN}}$ is High), then the CPU 10 drives the PET 52 through port PON1.

When the switch 106 is first turned ON, the FETs 51 and 52 are turned ON. Power is supplied from the external power source or the built-in battery to a DC/DC converter 50. The DC/DC converter 50 outputs Vcc which powers the CPU 10, the EPROM 21, the DRAM 22 and the ROM 23. In this embodiment, Vcc=5V.

When the PETs 51 and 52 are turned OFF by signals output from the Ports PON1 and PON2, power is not supplied to the DC/DC converter 50. Therefore, the power to the CPU 10 is cut and the printer 100 is turned OFF. In order to turn the printer 100 ON it is necessary to press the switch 106 again, thereby providing power to the FETs 51 and 52.

The built-in battery 90 is a rechargeable battery, such as a Nickel Cadmium battery. The battery 90 supplies 14.4 VDC to the printer 100. A power source connector 70 is provided to connect the external power source, such as an AC adapter 80, to the printer 100. The AC adapter 80 includes a constant current source 81 and a constant voltage source 82. An output of the constant current source 81 is connected to a battery charge control circuit 60, and is used to recharge the battery 90. An output of the constant voltage source 82, is connected to an input of the DC/DC converter 50.

As described above, the constant current source 81 is provided in the AC adapter 80, and not in the printer 100, since the constant current source 81 is only required for charging the battery. Therefore, the size and weight of the printer 100 is reduced.

In order to maximize the efficiency of charging the battery 90, the battery 90 is first refreshed (completely discharged) before being recharged. This reduces the 'memory' effect of the battery 90. The memory effect of a battery occurs when the battery is recharged without first being fully discharged. That is, if the battery is repeatedly recharged without being fully discharged, the available battery capacity in reduced.

In the present embodiment, the refreshing of the battery 90 is controlled by the charging circuit 60. When the battery is to be refreshed, the CPU 10 transmits a $\overline{\text{REFRESH}}$ signal from the Port 6 to the charge control circuit 60. The charge control circuit 60 stops charging the battery 90, the FET 51 is turned OFF, and the FET 52 in turned ON. The FET 52 connects the battery 90 to a load (not shown) in order to refresh the battery 90.

In the present embodiment, the charging of the battery 90 is also controlled by the charging circuit 60. When the battery is to be charged, the CPU 10 transmits a $\overline{\text{CHARGE}}$ signal from the Port 5. The charge control circuit 60 starts charging the battery 90 using the constant current source 82 of the AC adapter 80. The voltage of the battery 90 is monitored by the CPU 10, to determine when to stop the charging operation.

The thermal head 40 has 2560 thermal elements arranged long a line, having a length equivalent to a width of one sheet of the thermosensitive paper used in the printer 100. Print data for the first through the 1280th thermal elements are grouped as the DATA1, while print data for the 1281st through the 2560th thermal elements are grouped as the DATA2. Further, as described above, the data DATA1 and DATA2 are transferred to the thermal head 40 synchronously with the reference clock signal CLK.

The thermal elements are divided into four groups, with each group driven by the strobe signals $\overline{\text{STB1}}$, $\overline{\text{STB2}}$, $\overline{\text{STB3}}$, and $\overline{\text{STB4}}$, respectively. With this arrangement, the number of thermal elements driven at one time may be varied in accordance with the power available from the battery 90. If the power available from the battery 90 is low, then each group of thermal elements may be driven sequentially. However, if the battery 90 is fully charged or the AC adapter 80 in used, all four groups of thermal elements may be driven simultaneously.

The printer 100 according to the embodiment has three modes of operation. These modes of operation are: a print mode M1, a refresh mode M2 and a charge mode M3. The selection of the three modes, as well the turning ON and OFF of the power, are controlled by the switch 106.

Figure 3:
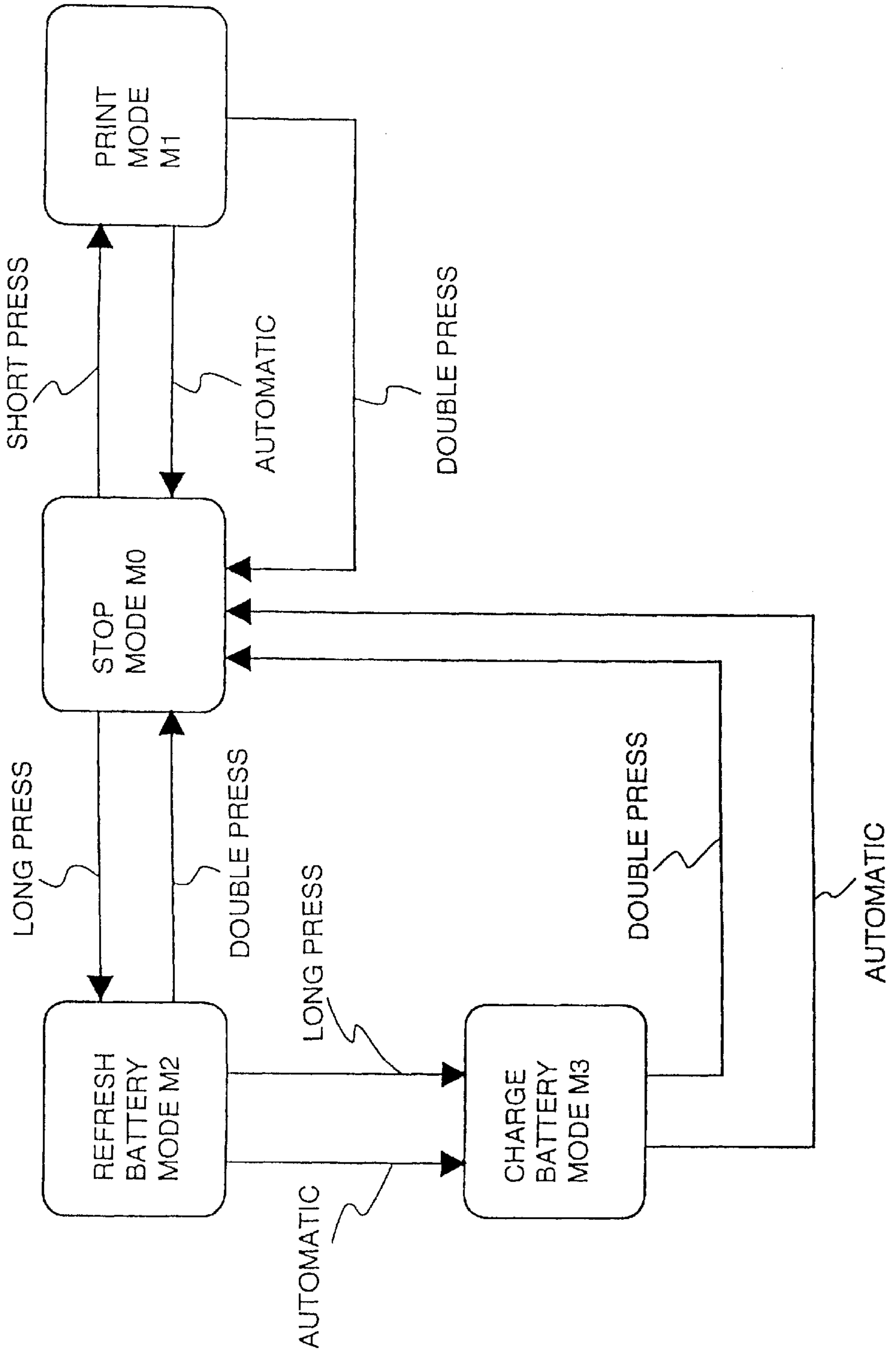
FIG. 3 shows a diagram of the operation of the mode control system according to the present invention.

FIG. 3 shows a diagram of the operation of the three modes mentioned above. Further, the printer 100 also has, a stop mode M0 (i.e. standby operation mode), in which the power is turned OFF. In order to switch from one mode to another, the switch 106 is pressed for a short time (i.e., a short press of leas than 500 msec.), a long time (i.e., a long press of more than 1 sec.) or pressed two times in quick succession (i.e., a double press in less than 500 msec.). The operation (duration and number of presses) of the switch 106 is detected at the Port 8 of the CPU 10.

As shown in FIG. 3, if the printer 100 is in the stop mode M0 (i.e. standby operation mode) and the switch 106 receives a short press, the printer 100 is set to the print mode M1. Thus, the power to the printer 100 is turned ON, and the printer 100 is ready to print data. However, if the printer 100 receives a long press while in the stop mode M0 (i.e. standby operation mode), the printer 100 is set to the refresh mode M2. In the refresh mode the battery 90 is refreshed (i.e., completely discharged). If the switch 106 is not pressed again, the printer 100 in automatically set to the charge mode M3, where the battery 90 is charged. If the printer 100 is in any of the three modes M1, M2 or M3 and the switch 106 receives a double press, the printer 100 is set to the stop mode M0 (i.e. standby operation mode) and the power is turned off.

In the refresh mode M2, if the switch 106 receives a long press, the refresh mode M2 is terminated and the printer 100 is set to the charge mode M3. In the charge mode M3, the CPU 10 monitors the voltage of the battery 90. When the CPU 10 determines that the voltage of the battery 90 has reached a predetermined value, the charging of the battery 90 is completed. The charge mode M3 is then terminated and the printer 100 is automatically set to the stop mode M0.

In the print mode M1, if no data or change in mode of operation is received by the printer 100 during a 60 second interval, the printer 100 is automatically set to the stop mode M0, and the power is turned OFF.

Figure 4A:
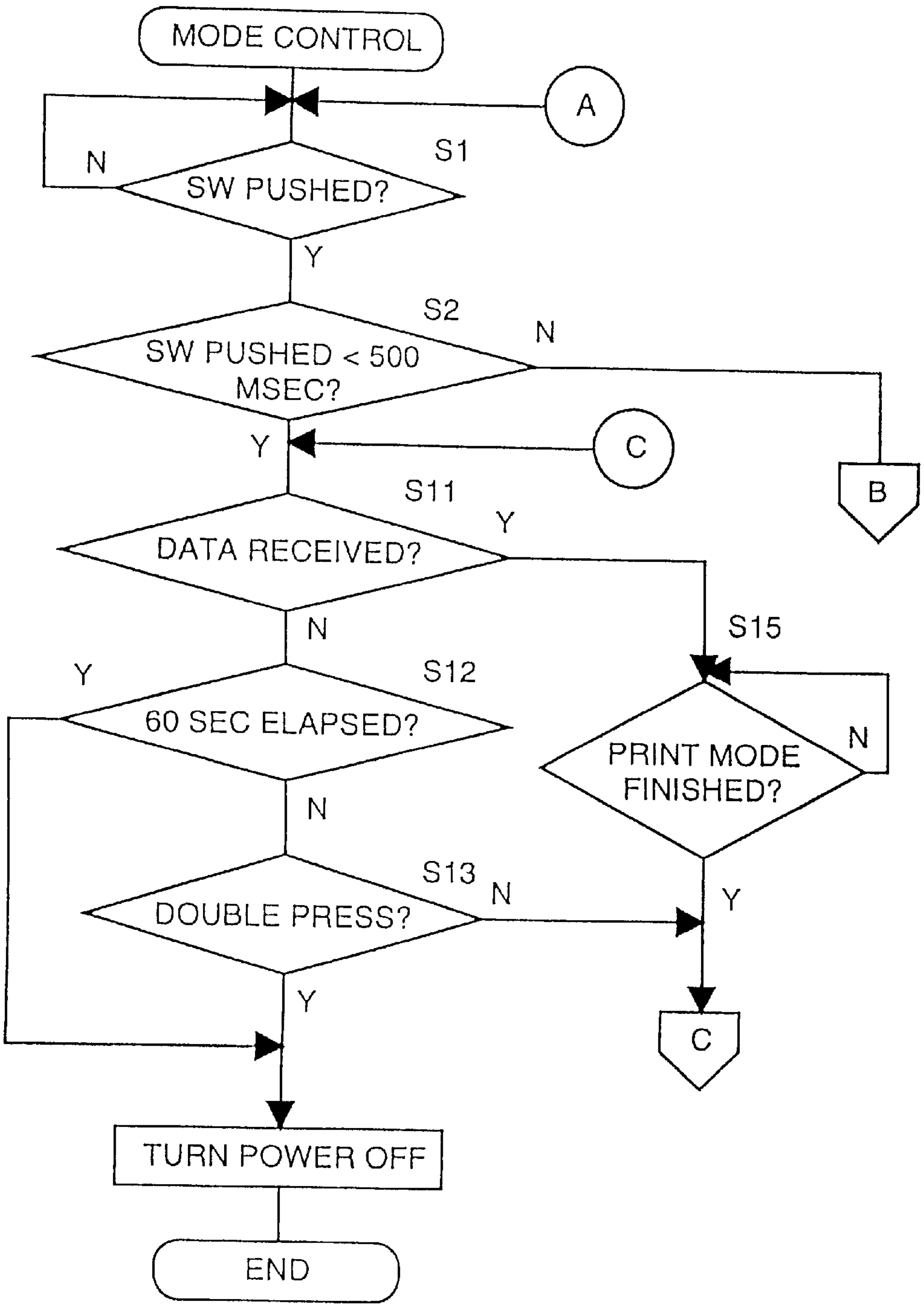
FIGS. 4A and 4B show a flow chart of the operation of the mode control system shown in FIG. 3.
Figure 4B:
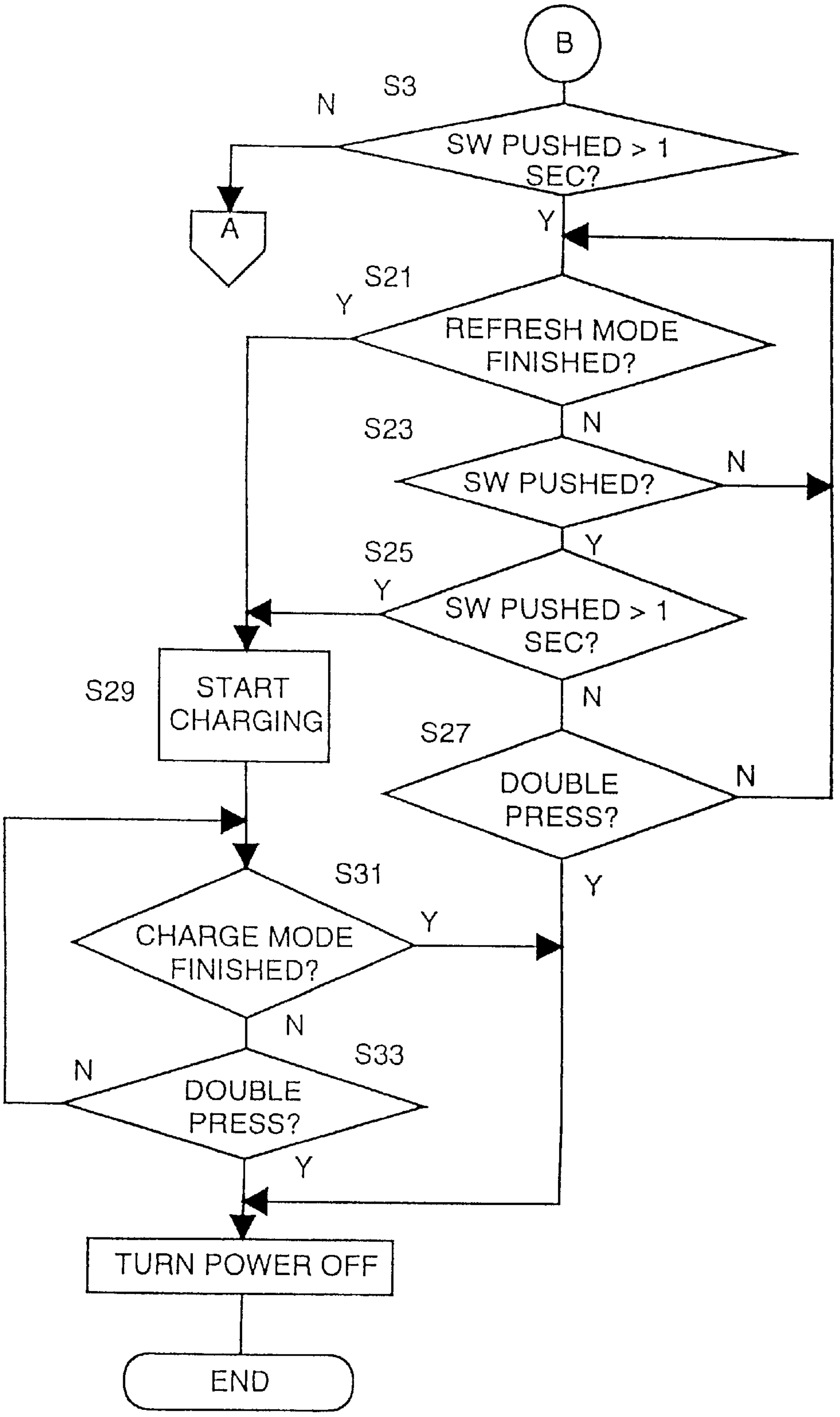

FIGS. 4A–4B shows a flow chart of the mode selection process diagrammed in FIG. 3. Initially, the power is OFF and the printer 100 is in the stop mode M0 (i.e., standby operation mode). The power remains OFF until the switch 106 in pressed in step S1. If the switch is pressed in step S1, the CPU 10 checks whether the switch is pressed for less than 500 msec in step S2. If the switch 106 is pressed for less than 500 msec (S2:Y), the CPU 10 determines whether data is received in step S11, and the printer is set to the print mode M1. Otherwise, the CPU 10 determines whether the switch is pressed for more than 1 sec. in step S3 (FIG. 4B).

If data is received (S11:Y), the CPU 10 determines whether the printing of the data is finished in step S15. If printing is finished (S15:Y), control goes to step S11, where the CPU 10 again determines whether any data is received. If printing has not finished, the step S15 is re-executed.

If no data is received (S11:N), the CPU 10 determines whether a 60 second time interval has elapsed, in step S12. If the 60 second time interval has elapsed (S12:Y), then the printer is set to the stop mode M0 (e.g., standby operation mode), the power is turned OFF and the routine ended.

If the 60 second time interval has not elapsed (S12:N) but the switch 106 received a double press (S13:Y), then the printer is set to the stop mode M0, the power in turned OFF and the routine ended. If the switch 106 did not receive a double press (S13:N), control goes to step S11, where the CPU 10 again determines whether any data is received.

At step S3, if the switch 106 is pressed for less than 1 second, control goes back to step S1, and the mode of operation remains unchanged.

However, if the switch 106 receives a long press (i.e., longer than 1 second) in step S3, the mode of operation is changed to the refresh mode M2. Then, at step S21, the CPU 10 determines whether the refresh mode M2 is finished. If the refresh mode M2 is not finished (S21:N) and the switch 106 is not pressed in step S23, then control returns to step S21. If the switch is pushed for more than 1 second (S23:Y, S25:Y), then the mode is changed to the charge mode M3 and control proceeds to step S29. Similarly, in step S21, if the refresh mode M2 is finished, the mode is automatically changed to the charge mode M3 and control proceeds to step S29.

At step S25, if the switch is pressed for less than 1 second (S25:N), but not double pressed (S27:N), then control goes back to step S21. If the switch is pressed for less than 1 second (S25:N), and double pressed (S27:Y), then the mode is changed to the stop mode (i.e. standby operation mode), the printer is turned off, and the routine is ended.

Step S29 starts the charging of the battery 90. Then, at step S31, the CPU 10 determines whether the charge mode is finished by monitoring the voltage of the battery 90, as explained before. If the charge mode is finished (S31:Y), then the mode is changed to the stop mode (i.e., standby operation mode), the printer is turned off, and the routine is ended. If the charge mode is not finished (S31:N), but the switch 106 receives a double press (S33:Y), then the mode in changed to the stop mode, the printer is turned off, and the routine is ended. If the switch 106 is pressed (but does not receive a double press, S33:N), then control repeats step S31, and charging of the battery 90 continues.

As described above, a single switch 106 can turn the power to the printer ON and OFF, as well as select one of three modes of operation of the printer 100. Therefore, the number of switches used in the printer are reduced, and the overall size and cost to manufacture the printer are reduced. Only three nodes of operation are shown here. However, the number of modes of operation that the switch 106 can select it not limited to three. For instance, the printer 100 could be configured such that every time the switch 106 in pressed, another mode of operation is selected, in sequence.

The present disclosure relates to subject matter contained in Japanese Patent Application No. HEI 6-138226 filed on May 27, 1994 which is expressly incorporated herein by reference in its entirety.

What is claimed is:

1. A printer mode control system for a printer having a battery, said printer mode control system comprising:

a plurality of operating modes, including a charging mode, enabling battery charging by a charging portion, and a printing mode, enabling printing by a printing portion;

a manually operable member;

duration detecting means for detecting a duration of operation of said manually operable member, said duration being a time period of operation;

frequency detecting means for detecting a frequency of operation of said manually operable member, said frequency being defined as a plurality of operations within a predetermined time period;

determining means for determining a subsequent operating mode of said plurality of operating modes, based on a current operating mode of said plurality of operating modes, and based on said duration of operation and said frequency of operation of said manually operable member, wherein said determining means determines a standby operation mode as said subsequent operation mode upon a predetermined detected operation of said manually operable member; and switching means for switching from said current operating mode to said subsequent operating mode.

2. The printer mode control system according to claim 1, said plurality of operating modes further including:

a standby mode disabling said charging portion and said printing portion; and a refresh mode disabling said charging portion, disabling said printing portion, and discharging said battery.

3. The printer mode control system according to claim 2, wherein:

when said current operating mode is said standby mode, said determining means allows said refresh mode and said printing mode to be determined as said subsequent operating mode;

when said current operating mode is said refresh mode, said determining means allows said charging mode and said standby mode to be determined as said subsequent operating mode; and when said current operating mode is said charging mode or said printing mode, said determining means allows said standby mode to be determined as said subsequent operating mode.

4. The mode control system according to claim 1, wherein said predetermined detected operation of said manually operable member upon which said determining means determines a standby operation mode as said subsequent operation mode is the same detected operation for any current operating mode.

* * * * *

UNITED STATES PATENT AND TRADEMARK OFFICE

CERTIFICATE OF CORRECTION

PATENT NO. : 6,108,097

DATED : August 22, 2000

INVENTOR(S) : M. Suzuki, et. al.

It is certified that error appears in the above-indentified patent and that said Letters Patent is hereby corrected as shown below:

Title page, item [30], Foreign Application Priority Data, change "6-128226" to --6-138226--

Signed and Sealed this

Tenth Day of April, 2001

Attest:

Nicholas P. Godici

NICHOLAS P. GODICI

*Attesting Officer* *Acting Director of the United States Patent and Trademark Office*